(12) United States Patent
Matsuo et al.

(10) Patent No.: US 8,902,349 B2
(45) Date of Patent: Dec. 2, 2014

(54) IMAGE PICKUP APPARATUS

(75) Inventors: Keigo Matsuo, Akiruno (JP); Hisashi Goto, Tokyo (JP)

(73) Assignee: Olympus Corporation, Tokyo (JP)

( * ) Notice: Subject to any disclaimer, the term of this patent is extended or adjusted under 35 U.S.C. 154(b) by 485 days.

(21) Appl. No.: 13/278,309

(22) Filed: Oct. 21, 2011

(65) Prior Publication Data
US 2012/0099006 A1  Apr. 26, 2012

(30) Foreign Application Priority Data
Oct. 21, 2010  (JP) .................................. 2010-236577

(51) Int. Cl.
*H04N 5/232* (2006.01)
*G02B 7/36* (2006.01)

(52) U.S. Cl.
CPC .............. *H04N 5/23212* (2013.01); *G02B 7/36* (2013.01)
USPC ......................................... 348/349; 348/345

(58) Field of Classification Search
CPC ........ H04N 5/23212; G02B 7/36; G02B 7/28; G03B 13/36
See application file for complete search history.

(56) References Cited

U.S. PATENT DOCUMENTS

| | | | |
|---|---|---|---|
| 5,005,040 A * | 4/1991 | Norita et al. | 396/96 |
| 6,097,897 A * | 8/2000 | Ide | 396/93 |
| 6,829,008 B1 * | 12/2004 | Saga et al. | 348/302 |
| 2005/0068428 A1 * | 3/2005 | Uchida | 348/231.3 |
| 2007/0237511 A1 * | 10/2007 | Kusaka | 396/111 |
| 2009/0202234 A1 * | 8/2009 | Ichimiya | 396/89 |

FOREIGN PATENT DOCUMENTS

| | | | |
|---|---|---|---|
| JP | 9-127407 A | 5/1997 |
| JP | 3592147 B2 | 11/2004 |
| JP | 2008-102275 A | 5/2008 |

OTHER PUBLICATIONS

Japanese Office Action dated Jul. 23, 2014, issued in corresponding Japanese Patent Application No. 2010-236577 (3 pages).

* cited by examiner

*Primary Examiner* — Luong T Nguyen
(74) *Attorney, Agent, or Firm* — Westerman, Hattori, Daniels & Adrian, LLP

(57) ABSTRACT

An image pickup apparatus, includes a computing section which computes a defocus amount which has been estimated, a calculating section which calculates an accuracy of defocus detection, a setting section which sets a correction value from a result of the calculating section, a correcting section which corrects the correction value obtained from the result of the setting section, to reduce an absolute value of the defocus amount which has been estimated, a lens-drive amount calculating section which calculates a lens-drive amount based on a result from the correcting section, and a control section which, at the time of video photography, carries out focusing successively by using the defocus amount and the lens drive amount obtained from the computing section, the calculating section, the setting section, and the correcting section.

5 Claims, 17 Drawing Sheets

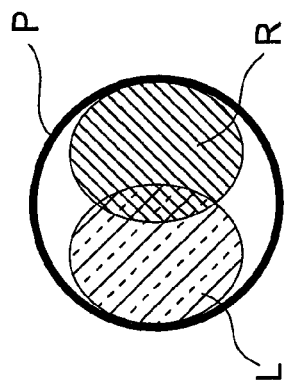
FIG. 2C
FIG. 2F
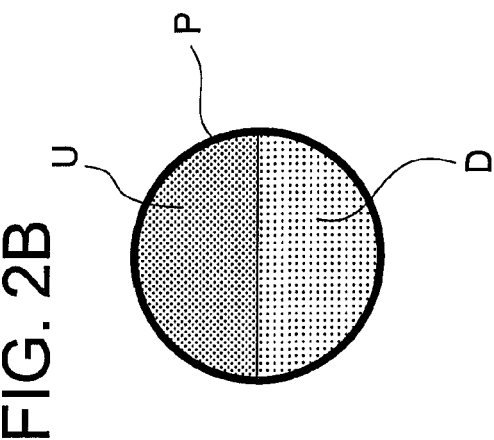
FIG. 2B
FIG. 2E
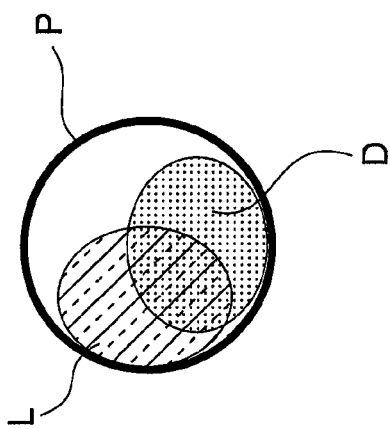
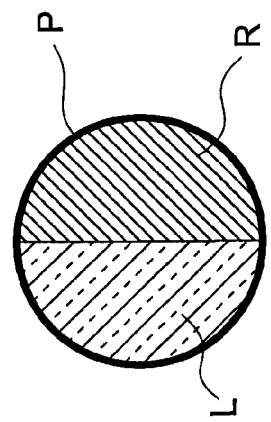
FIG. 2A
FIG. 2D
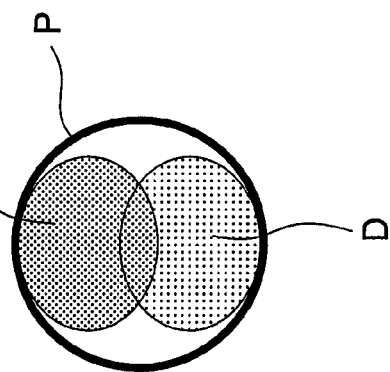

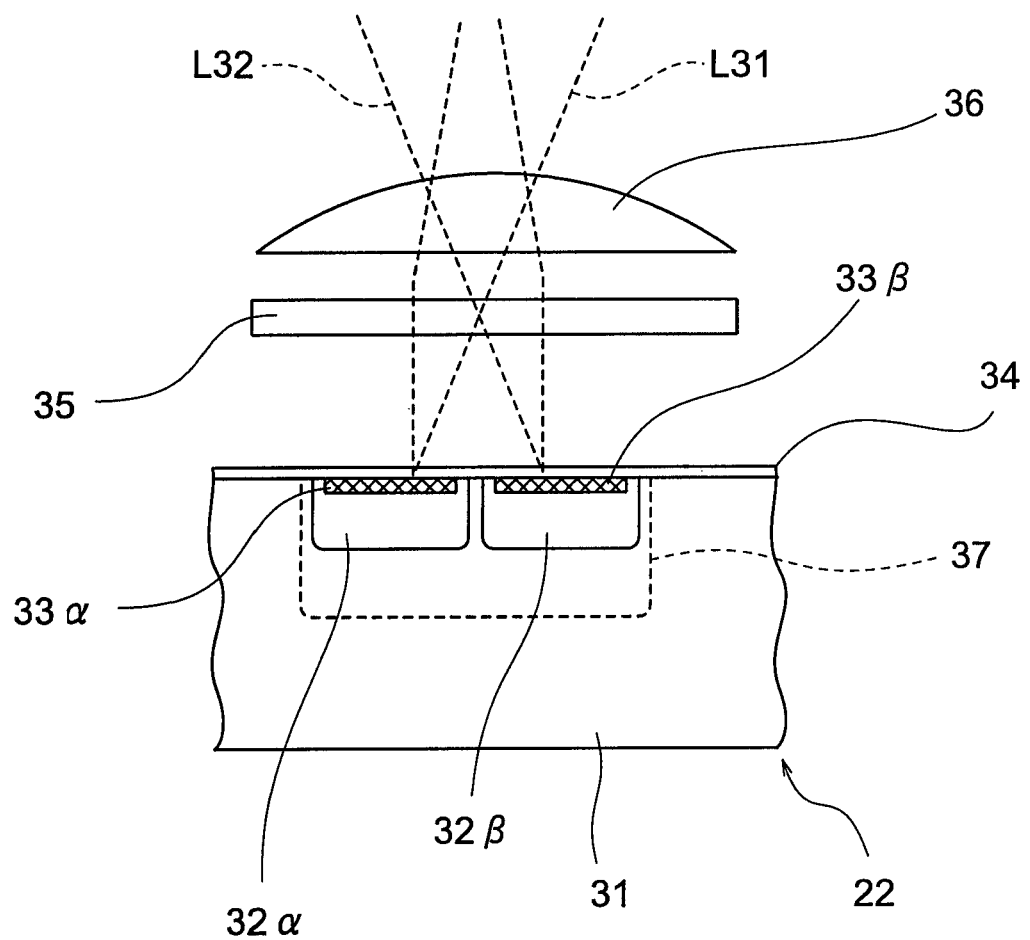

FIG. 9

|     | F01 | F02 | F03 | F04 | F05 | F06 | F07 | F08 | F09 | F10 |
|-----|-----|-----|-----|-----|-----|-----|-----|-----|-----|-----|
| L01 | G | R | G | R | G | R | G | R | G | R |
| L02 | B | G | B | G | B | G | B | G | B | G |
| L03 | G | R | G | R | G | R | G | R | G | R |
| L04 | B | G | B | G | B | G | B | G | B | G |
| L05 | G | R | G | R | G | R | G | R | G | R |
| L06 | B | G | B | G | B | G | B | G | B | G |
| L07 | G | R | G | R | G | R | G | R | G | R |
| L08 | B | G | B | G | B | G | B | G | B | G |
| L09 | G | R | G | R | G | R | G | R | G | R |
| L10 | B | G | B | G | B | G | B | G | B | G |

FIG. 10

|     | F01 | F02 | F03 | F04 | F05 | F06 | F07 | F08 | F09 | F10 |
|-----|-----|-----|-----|-----|-----|-----|-----|-----|-----|-----|
| L01 | G | R | G | R | G | R | G | R | G | R |
| L02 | B | G | B | G | B | G | B | G | B | G |
| L03 | G | R | G | R | G | R | G | R | G | R |
| L04 | B | G | B | G | B | G | B | G | B | G |
| L05 | G | R | G | R | G | R | G | R | G | R |
| L06 | B | G | B | G | B | G | B | G | B | G |
| L07 | G | R | G | R | G | R | G | R | G | R |
| L08 | B | G | B | G | B | G | B | G | B | G |
| L09 | G | R | G | R | G | R | G | R | G | R |
| L10 | B | G | B | G | B | G | B | G | B | G |

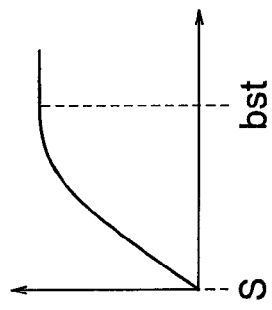
FIG. 12D
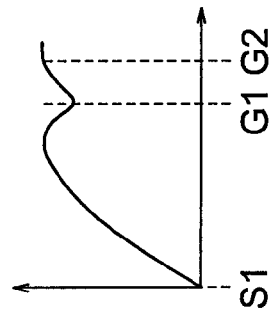
FIG. 12E
FIG. 12A
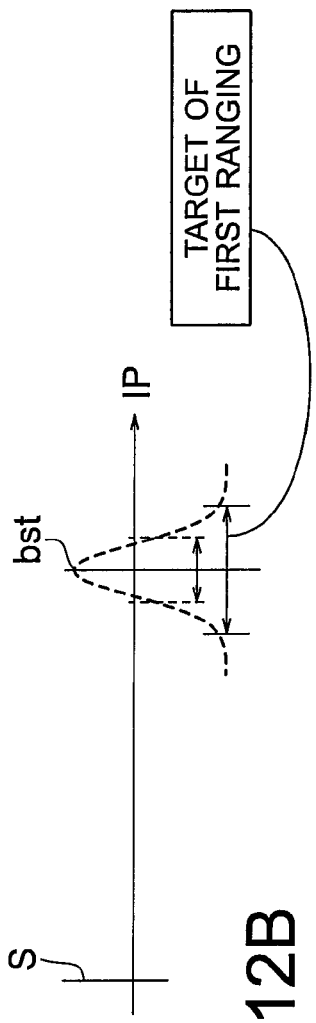
FIG. 12B
FIG. 12C
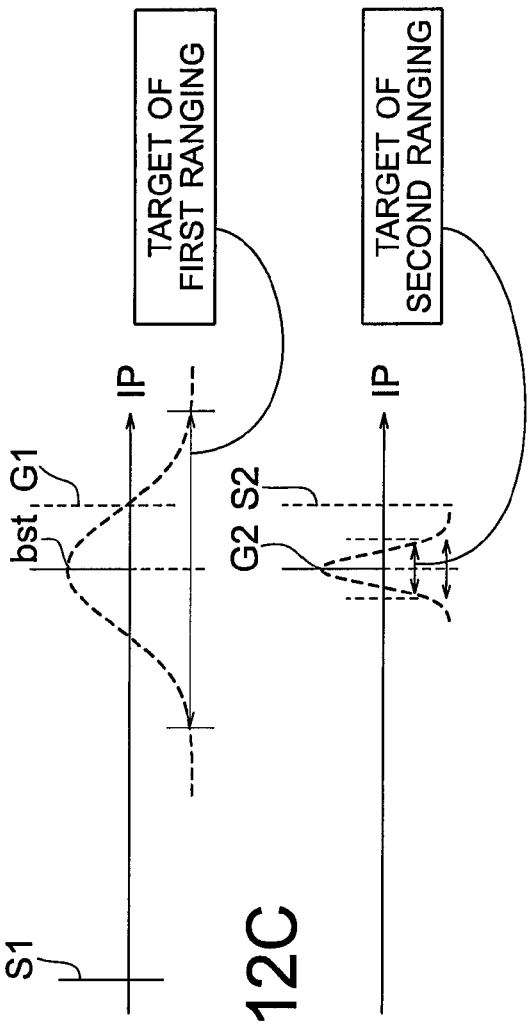

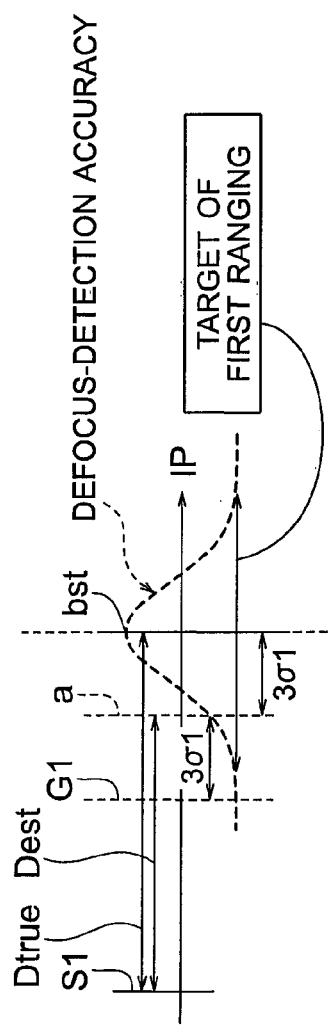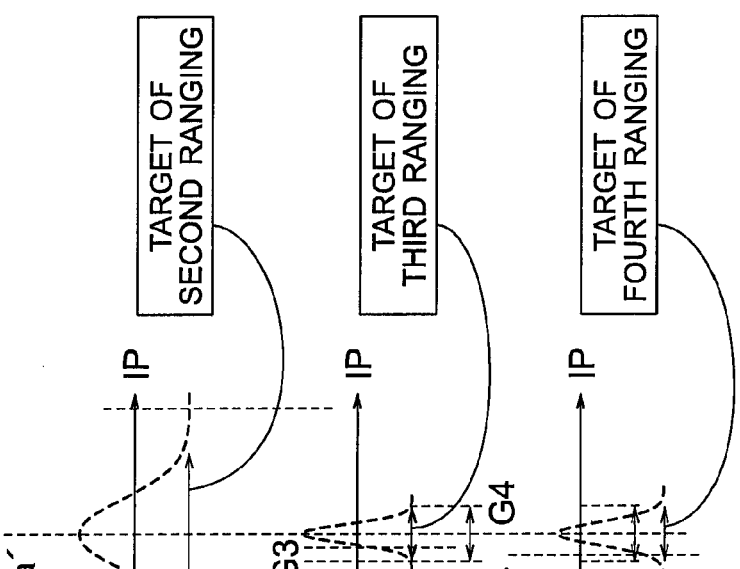

IMAGE PICKUP APPARATUS

CROSS-REFERENCE TO RELATED APPLICATION

The present application is based upon and claims the benefit of priority from the prior Japanese Patent Application No. 2010-236577 filed on, Oct. 21, 2010; the entire contents of which are incorporated herein by reference.

BACKGROUND OF THE INVENTION

1. Field of the Invention
The present invention relates to an image pickup apparatus.
2. Description of the Related Art
Generally, a ranging accuracy of a phase-difference autofocus (AF) (hereinafter, appropriately called as 'AF') is determined by a center of gravity Fno which can be captured by an AF sensor and a distance between pixels for focal-point detection (hereinafter, 'focal-point detection pixels').

As a conventional example of an image pickup apparatus in which, an element in which pixels for image pickup (hereinafter, 'image-pickup pixels') and the focal-point detection pixels are arranged in rows two-dimensionally, a structure disclosed in Japanese Patent No. 3592147 Specification has hitherto been known. In the conventional image pickup apparatus, there are mainly two ranging methods which are as follow.
(1) Contrast method
(2) Phase-difference method.

(1) In the contrast method, a so-called mountain-climbing method in which, a contrast value is evaluated while carrying out wobbling by changing a focusing state has been adopted. Therefore, focusing time is long.

(2) Moreover, in video photography, an image at the time of wobbling is also recorded. Therefore, an image quality is degraded. Moreover, in the phase-difference method in (2), basically, an amount of defocus (hereinafter, 'defocus amount') can be detected by ranging once. Therefore, focusing time is short.

Generally, the ranging accuracy of the phase-difference method changes according to characteristics of an object. For example, for an object with a low illuminance and low contrast, the ranging accuracy is degraded. In a conventional measure, an operation to check the reliability of the defocus amount which has been calculated by correlation matching, ranging to verify has been carried out.

For example, when a low-contrast object is captured, the ranging accuracy is degraded, and as a result of a first ranging, focusing is rearward of the best image-plane position. Moreover, by a second ranging, it is possible to focus at the best image-plane position.

At this time, when it is a still photography, it is desirable to expose in a state of being focused at the best image-plane position, and to acquire the final image. Whereas, in video photography, during the ranging operation, an image is focused at a position rearward of the best image-plane position in the first ranging or in other words, at a position on an image-plane side. Furthermore, in the second ranging, even a step of focusing at the best image-plane position is also recorded. Therefore, the image quality is degraded. This state is same as the wobbling of the contrast AF being recorded.

SUMMARY OF THE INVENTION

An image pickup apparatus according to a first aspect of the present invention, which is capable of video photography, having an image pickup optical system which can be mounted or fixed, and an image pickup element in which, pixels having a photoelectric converter are arranged in rows two-dimensionally, includes
a computing section which computes a defocus amount which has been estimated,
calculating section which calculates an accuracy of defocus detection,
a setting section which sets a correction vale from a result of the calculating section,
a correcting section which corrects the correction value obtained from the result of the setting section, to reduce an absolute value of the defocus amount which has been estimated,
a lens-drive amount calculating section which calculates a lens drive amount based on a result from the correcting section, and
a controller which, at the time of video photography, carries out focusing successively by using the defocus amount and the lens-drive amount obtained from the computing section, the calculating section, the setting section, and the correcting section.

Moreover, in an image pickup apparatus according to a second aspect of the present invention, having an image pickup optical system which can be mounted or fixed, and an image pickup element in which, pixels having a photographic converter are arranged in rows two-dimensionally,
at least some of the pixels are focal-point detection pixels which are arranged such that a direction of incidence of light beam which is incident on the pixel is restricted, and
the pixels other than the focal-point detection pixels are arranged such that the light beam incident on the pixel is not as restricted as for the focal-point detection pixel, and
the focal-point detection pixel outputs at least a signal for ranging, and
the image-pickup pixel outputs at least a signal for an image, and
the image pickup apparatus which is capable of video photography, having an image pickup optical system which can be mounted or fixed, and an image pickup element in which, pixels having a photographic converter are arranged in rows two-dimensionally, includes
a computing section which computes a defocus amount which has been estimated,
a calculating section which calculates an accuracy of defocus detection,
a setting section which sets a correction value from a result of the calculating section, and
a correcting section which corrects the correction value obtained from the result of setting section, to reduce an absolute value of the defocus amount which has been estimated,
a lens-drive amount calculating section which calculates a lens drive amount based on a result from the correcting section,
a controller which, at the time of video photography, carries out focusing successively by using the defocus amount and the lens-drive amount obtained from the computing section, the calculating section, the setting section, and the correcting section.

BRIEF DESCRIPTION OF THE DRAWINGS

FIG. 2A, FIG. 2B, FIG. 2C, FIG. 2D, and FIG. 2E are diagrams, each showing a structure of an exit pupil according to a respective embodiment of the present invention,
and FIG. 2F is a diagram explaining a meaning of each shaded portion;

FIG. 3 is a diagram showing a structure of a photoelectric converter of an image pickup element according to an embodiment of the present invention;

FIG. 9 is a plan view showing a structure (variation 3) of the image pickup element;

FIG. 10 is a plan view showing a structure (variation 4) of the image pickup element;

FIG. 12A, FIG. 12B, FIG. 12C, FIG. 12D, and FIG. 12E are diagrams, each explaining conventional focusing;

FIG. 13A, FIG. 13B, FIG. 13C, and FIG. 13D, and FIG. 13E are diagrams, each explaining focusing in each of the embodiments;

DETAILED DESCRIPTION OF THE INVENTION

Exemplary embodiment of an image pickup apparatus according to the present invention will be described below in detail by referring to the accompanying diagrams. However, the present invention is not restricted to the embodiment described below.

First Embodiment (Digital Camera)

To start with, a camera which is includes the image pickup apparatus according to the embodiments of the present invention will be described below.

Figure 1:
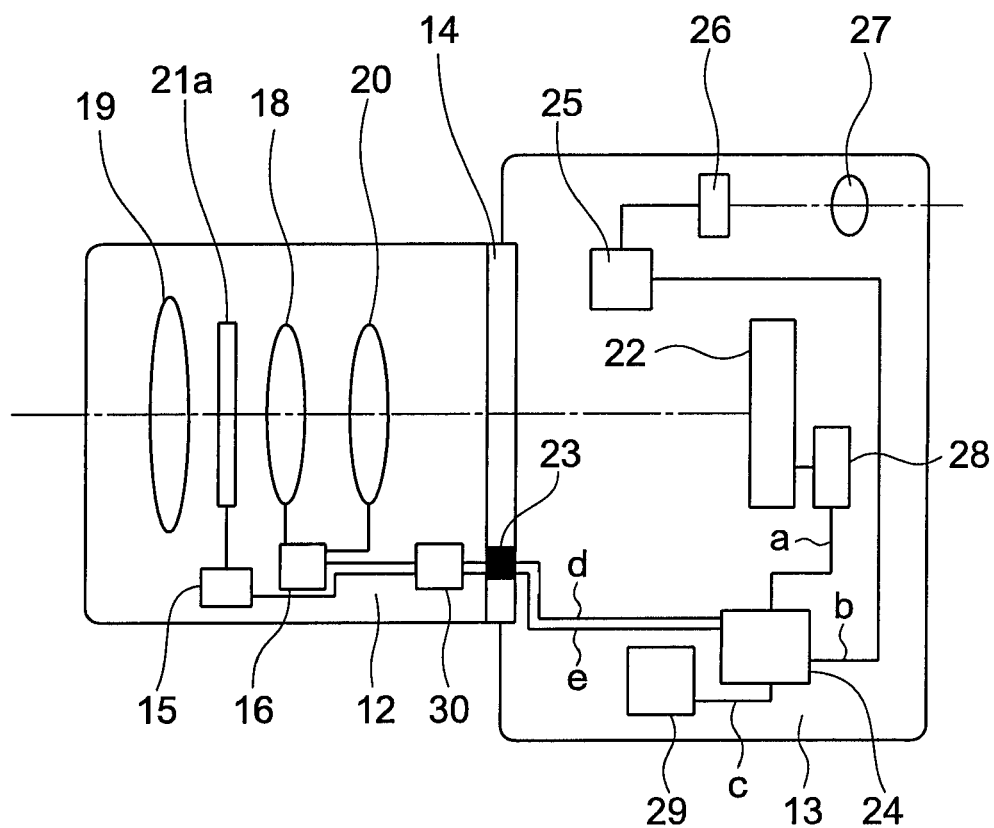
FIG. 1 is a diagram showing an internal structure of a digital camera according to a first embodiment of the present invention.

FIG. 1 is a diagram describing an internal structure of a digital camera 11 according to the embodiment of the present invention.

The digital camera 11 includes an interchangeable lens 12 and a camera body 13. The interchangeable lens 12 includes a lens controller 30, a lens driving section 16, an aperture driving section 15, a lens for zooming (hereinafter, 'zooming lens') 18, a lens 19, a lens for focusing (hereinafter, 'focusing lens') 20, and an aperture 21a. The lens controller 30 is made of peripheral components such as a microcomputer and a memory, and carries out functions such as drive control of the focusing lens 20 and the aperture 21a, detection of state of the aperture 21, the zooming lens 18, and the focusing lens 20, transmission of lens information for a body controller 24, and reception of camera information.

The aperture driving section 15 controls a diameter of the aperture 21a based on a signal from the body controller 24, via the lens controller 30. Moreover, the lens driving section 16 drives the zooming lens 18 and the focusing lens 20 based on a signal from the body controller 24, via the lens controller 30. The camera body 13 includes members such as an image pickup element 22, the body controller 24, a liquid-crystal display element driving circuit 25, a liquid-crystal display element 26, an eyepiece 27, and a memory card 29. Pixels which will be described later are arranged in rows two-dimensionally in the image pickup element 22, and pickup an object image to be formed by the interchangeable lens 12 upon being disposed on an image forming surface on which an image is to be formed, of the interchangeable lens 12. Focal-point detection pixels (hereinafter, 'AF pixels') are arranged in rows at predetermined focal-point detection position of the image pickup element 22.

Here, the interchangeable lens 12 corresponds to an image pickup optical system, and the image pickup element 22 corresponds to an image pickup element.

The body controller 24 includes peripheral components such as a microcomputer and a memory, and carries out functions such as reading an image signal from the image pickup element, correction of the image signal, detection of a focal-point adjustment state of the interchangeable lens 12, reception of lens information from the lens controller 30, transmission of camera information (defocus amount), and drive control of the overall digital camera, via an image pickup element driving circuit 28. The body controller 24 and the lens controller 30 carry out communication of a mounting section 14 via an electric contact member 23, and carry out transfer of various types of information.

The liquid-crystal display driving circuit 25 drives the liquid-crystal display element 26. A photographer observes an image displayed on the liquid-crystal display element 26 via the eyepiece 27. The memory card 29 is detachable from the camera body 13 and is a portable storage medium which stores image signals.

An object image which is formed on the image pickup element 22 upon passing through the interchangeable lens 12 is subjected to photoelectric conversion by the image pickup element 22, and an output thereof is sent to the body controller 24. The body controller 24 calculates a lens-drive amount based on a defocus amount at a predetermined focal-point detection position based on output data (first image signal and second image signal) of the AF pixels on the image pickup element 22. Moreover, the body controller 24 stores an image signal which has been generated based on an output of the image pickup element 22 in the memory card 29, as well as sends the image signal to the liquid-crystal display element driving circuit 25, and displays an image on the liquid-crystal display element 26.

An operating member (such as a shutter member and setting member for setting the focal-length detection position) which is not shown in the diagram is provided on the camera body 13. The body controller 24 detects such operation-state signal from the operating member, and carries out control of an operation (image pickup operation, setting operation of setting the focal-point detection position, and image processing operation) according to a detection result.

The lens controller 30 changes lens information according to a focusing state, a zooming state, an aperture-setting state, and an aperture opening F value. Concretely, the lens controller 30 monitors positions of the lens 18 and the focusing lens 20, and an aperture position, and computes lens information according to monitor information, or selects lens information corresponding to the monitor information from a look-up table which has been prepared in advance. The lens controller 30 drives the focusing lens 20 to a focused focal point by a drive source such as a monitor based on the lens-drive amount which has been received.

(Structure of Image Pickup Element)

The structure of the digital camera 11 described above is common in all the embodiments described below with the same components as in the digital camera 11 having assigned the same reference numerals as in the first embodiment. Next, a structure of the image pickup element 22 of the image pickup apparatus in the digital camera 11 will be described below.

FIGS. 2A to 2E are diagrams showing exemplary arrangements of the exit pupil of a camera and an image pickup apparatus according to an embodiment of the present invention. FIG. 2F is a diagram showing the correspondence between the hatching patterns shown in FIGS. 2A to 2E and pixel areas.

Specific examples (1) to (5) of the arrangement of pixels are given below:

(1) an arrangement in which the exit pupil P is divided vertically into two areas, which include a left pupil detection pixel L and a right pupil detection pixels R respectively (FIG. 2A);

(2) an arrangement in which the exit pupil P is divided horizontally into two areas, in which an upper pupil detection pixel U and a lower pupil detection pixel D are arranged respectively (FIG. 2B);

(3) an arrangement having two partly overlapping areas arrange in the left and the right side, in which a left pupil detection pixel L and a right pupil detection pixel R are arranged respectively (FIG. 2C);

(4) an arrangement having two partly overlapping upper and lower areas, in which an upper pupil detection pixel U and a lower pupil detection pixel D are arranged respectively (FIG. 2D); and (5) an arrangement having two overlapping areas located at arbitrary positions in which a left pupil detection pixel L and an area including a lower pupil detection pixel D are arranged respectively (FIG. 2E).

Although the pupils for ranging shown in FIGS. 2A to 2E have a semicircular shape or an elliptic shape, the shape of the pupils is not limited to them, but they may have other shapes such as a rectangular shape or a polygonal shape.

The arrangements shown in FIGS. 2A and 2B may be used in combination to include left, right, upper and lower focus detection pixels. The arrangements shown in FIGS. 2C and 2E may be used in combination to include left, right, upper and lower focus detection pixels. The arrangements shown in FIGS. 2C and 2E may be used in combination to include left and right focus detection pixels and focus detection pixels for detecting oblique lines. The arrangements of the focus detection pixels are not limited to those described above.

In the image pickup apparatus according to this embodiment, the pupil includes different areas. A first image signal is obtained from the output of the photo electric converter that receives light beams having passed through one of the areas, and a second image signal is obtained from the output of the photo electric converter that receives light beams having passed through the other of the areas. The focusing state of the taking lens is detected by measuring the phase difference on the basis of these signals.

In the following, specific ways of division of the exit pupil will be described with reference to FIGS. 3 to 6.

(A Division of Photo Electric Converter)

First, a case in which division of the exit pupil is achieved by dividing the photoelectric converter of the image pickup element 22 will be described with reference to FIG. 3. FIG. 3 shows the structure of the photoelectric converter of the image pickup element 22.

The image pickup element 22 includes a p-type well 31 provided in a substrate and n-type regions 32α, 32β in which photo-induced charge is generated and accumulated in cooperation with the p-type well, and a floating diffusion region (which will be hereinafter referred to as "FD region") that is not shown in FIG. 3 and to which the photo-induced charge accumulated in the n-type regions 32α, 32β is transferred, surface p+ layers 33α, 33β that collect the photo-induced charge accumulated in the n-type regions 32α, 32β to efficiently transfer the photo-induced charge to the FD region, a transfer gate (not shown) through which the photo-induced charge is transferred to the FD region, an $SiO_2$ film 34 for insulating the gate, a color filter 35 of Bayer arrangement, and a micro lens 36 for collecting light coming from an object.

The micro lens 36 is shaped and located in such a way as to make the pupil of the lens 19 (FIG. 1) and the surface p+ layers 33α and 33β conjugate with each other. The photo-induced charge is generated in an area 37 schematically shown in FIG. 3.

In the case shown in FIG. 3, the photoelectric converter is divided into two sections, one including the n-type regions 32α and the surface p+ layers 33α, and the other including the n-type regions 32β and the surface p+ layers 33β, thereby dividing the exit pupil. Light beams L31 and light beams L32 are incident on the area including the n-type region 32α and surface p+ layer 33α and the area including the n-type region 32β and the surface p+ layer 33β respectively.

(Offsetting, or Decentering the Openings)

Figure 4:
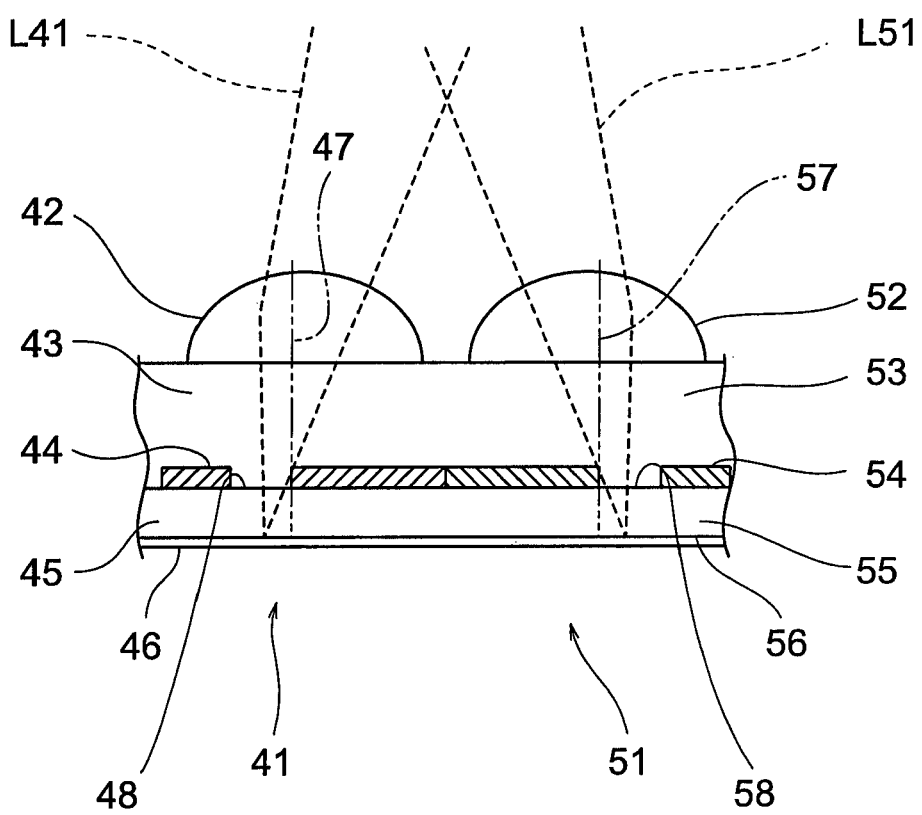
FIG. 4 is a cross-sectional view showing a structure of two adjacent pixels of the image pickup element according to the embodiment of the present invention.

Next, a case in which division of the exit pupil is achieved by offsetting the openings of pixels of the image pickup element 22 from the centers of photoelectric conversion elements will be described with reference to FIG. 4. FIG. 4 is a cross-sectional view showing the structure of two adjacent pixels of the image pickup element 22.

A pixel 41 has, in order from the top, a micro lens 42, a smooth layer 43 that provides a flat surface on which the micro lens 42 is formed, a light shielding film 44 for preventing color mixture between color pixels, a smooth layer 45 for smoothing a surface on which a color filter layer is provided, and a photoelectric conversion element 46. Another pixel 51 also has, in order from the top, a micro lens 52, a smooth layer 53, a light shielding film 54, a smooth layer 55, and a photoelectric conversion element 56, as with the pixels 41.

In the pixels 41 and 51, the light shielding films 44 and 54 have openings 48 and 58 that are offset outwardly from the centers 47 and 57 of the photoelectric conversion elements 46 and 56 respectively.

In the case shown in FIG. 4, the openings of the pixels of the image pickup element 22 are offset (decentered) from the centers of the photoelectric conversion elements. Therefore, light beams L41 and light beams L51 are incident on the photoelectric conversion elements 46 and 56 respectively. Thus, division of the exit pupil is achieved.

Figure 5:
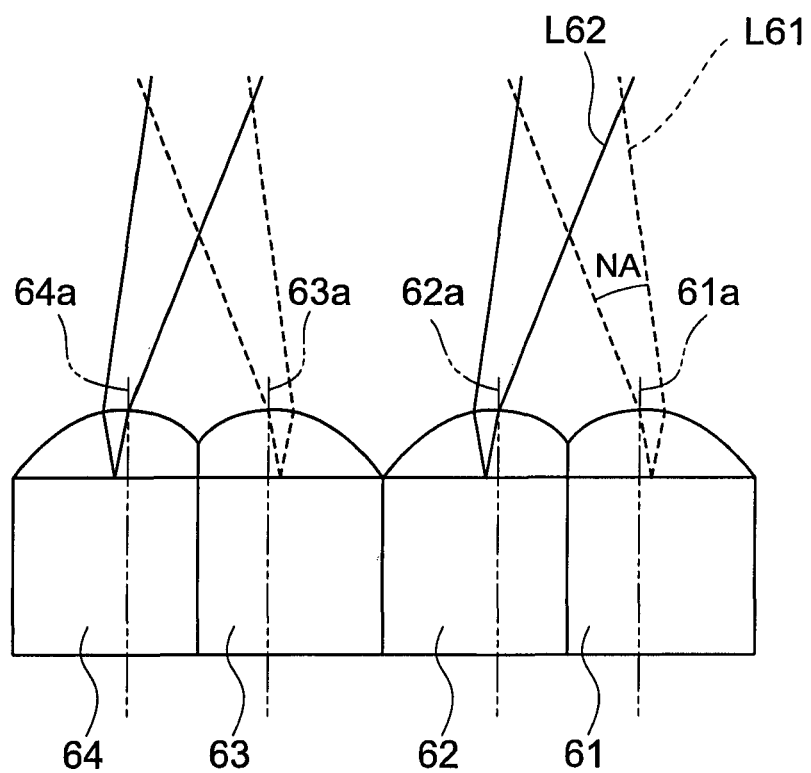
FIG. 5 is a diagram showing an internal structure of the image pickup element according to the embodiment of the present invention.

Next, a case in which division of the exit pupil is achieved by offsetting or decentering lenses will be described with reference to FIG. 5. FIG. 5 shows the internal structure of image pickup elements.

In the image pickup element shown in FIG. 5, on-chip lenses 61, 62, 63, and 64 on the respective pixels are independent from each other.

In FIG. 5, the optical axes 61a and 63a of the on-chip lenses 61 and 63 in a pixel group A are offset or decentered to the left from centers of the pixels. The optical axes 62a and 64a of the on-chip lenses 62 and 64 in a pixel group B are offset to the right from the centers of the pixels.

The focus amount of the lens 18 can be calculated by comparing the outputs from the two pixel groups A and B.

The on-chip lenses 61, 62, 63, and 64 have two independently controllable parameters, namely their refracting power and the position of the optical axis 61a, 62a, 63a, 64a. If the number of pixels are sufficiently large, the pixel group A and the pixel group B can have light intensity distributions similar to each other. Then, phase difference AF can be performed utilizing them. In this case, since the defocus amount can be detected in the entire area of the picture frame, three-dimensional information of the object can be obtained.

In the case shown in FIG. 5, the on-chip lenses of the image pickup element 22 are offset or decentered from the centers of the respective pixels. Therefore, light beams L61 and light beams L62 are incident on the on-chip lenses 61 and 62 respectively. Thus, division of the pupil is achieved.

Figure 6:
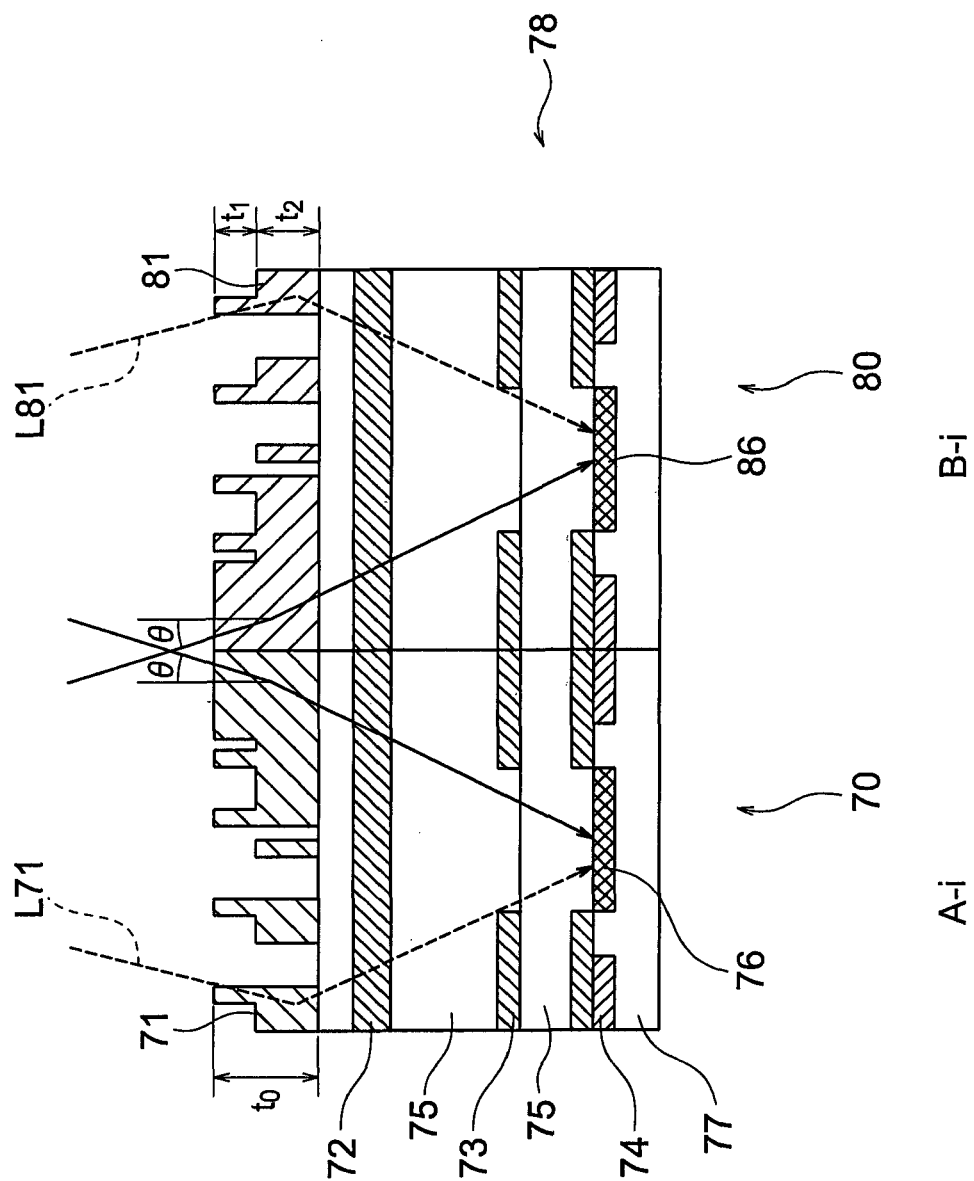
FIG. 6 is a diagram showing an internal structure of the image pickup element according to the embodiment of the present invention.

Next, a case in which DML (digital micro lenses) are used to divide the exit pupil will be described with reference to FIG. 6. FIG. 6 is a cross sectional view showing the internal structure of an image pickup element.

In the image pickup element shown in FIG. 6, DML are used as the on-chip lenses. Pixel 70 and pixel 80 are adjacent pixels that receive light beams from different regions.

The image pickup element shown in FIG. 6 has DMLs 71, 81, a color filter 72, aluminum wiring 73, a signal transmission part 74, a smooth layer 75, light-receiving elements (e.g. Si photodiodes) 76, 86, and an Si substrate 77. As shown in FIG. 6, the aluminum wiring 73, the signal transmission part 74, the smooth layer 75, the light receiving elements 76, 86, and the Si substrate 77 constitute a semiconductor integrated circuit 78. The pixel 70 and the pixel 80 have the same structure except for DMLs 71, 81.

FIG. 6 shows light beams among the entire incident light beams that are incident on the light receiving elements 76 and 86 respectively. With the use of DMLs 71 and 81, the light beams L71 and light beams L81 are incident on the light receiving element 76 of the pixel 70 and the light receiving element 86 of the pixel 80 respectively. Thus, division of the exit pupil is achieved.

As the image pickup element (or imager), the use may be made of a CCD (Charge Coupled Device), a CMOS (Complementary Metal Oxide Semiconductor), a back side illuminated CMOS, a sensor (e.g. Forveon X3) that can capture all three colors (red, green, and blue) in one pixel with three layers.

In the following description of the embodiments, the pixels for focus detection are adapted to receive light beams that have transmitted through different positions in the pupil of a taking lens by offsetting the on-chip lenses provided on the taking lens side of the photo electric converter from the centers of the pixels. The pupil may be divided by offsetting openings of a light shielding member from the centers of the pixels, by using DMLs, or by providing two photoelectric converters in one pixel, as described above.

The pixels for focus detection are adapted to receive light beams that have transmitted through different positions in the pupil of the taking lens. Therefore, the signal level of the signal output from a pixel for focus detection can be different from the signal level of the signals output from pixels for image picking-up located in the neighborhood of the pixel for focus detection. It is preferred that a signal for image picking-up at the position of a pixel for focus detection be obtained using one of the following methods (1) and (2):

(1) adjusting the gain for the signal output from the pixel for focus detection to make its signal level substantially equal to the signal level of the signals output from the pixels for image pickup in the neighborhood and employing the signal with thus adjusted gain as the signal for image picking-up at the position of this pixel for focus detection;

(2) executing pixel interpolation based on the signal output from the pixel for focus detection and the signals output from the pixels for image pickup in the neighborhood of the pixel for focus detection and employing the signal thus obtained as the signal for image picking-up at the position of this pixel for focus detection.

A method for the gain control is to be carried out as described below.

Firstly, a level of a signal as it is when output from the focal-point detection pixel and a level of a signal as it is when output from an image-pickup pixel near the focal-point detection pixel are to be compared. Next, the gain is to be controlled to bring the level of the signal which has been output from the focal-point detection pixel close to the level of the signal which has been output from the image-pickup pixel which is near the focal-point detection pixel. Thereafter, the signal of the focal-point detection pixel is to be subjected to the gain control and the signal obtained upon the gain control is demosaiced as an image signal, and the final image is to be obtained.

As a method for pixel interpolation, one of the following methods (a), (b), and (c) is preferable. However the method for pixel interpolation is not restricted to the methods (a), (b), and (c). It may be obtained not only by simple arithmetic average (also including weighted) but also by methods such as linear interpolation, multidimensional interpolation by polynomial, and median.

(a) A signal at a position of the focal-point detection pixel is to be interpolated based on a signal of the image-pickup pixel near the focal-point detection pixel. Next, a signal which is obtained by interpolating is to be demosaiced as an image signal at a position of the focal-point detection pixel, and the final image is to be acquired.

(b) The signal at the position of the focal-point detection pixel is to be interpolated based on the signal of the focal-point detection pixel and the signal of the image-pickup pixel near the focal-point detection pixel. Next, a signal which is obtained by interpolating is to be demosaiced as an image signal at the position of the focal-point detection pixel, and the final image is to be acquired.

(c) The signal at the position of the focal-point detection pixel is to be interpolated based on the signal of the image-pickup pixel near the focal-point detection pixel, and to be interpolated based on a signal which has been obtained by interpolating and the signal at the position of the focal-point detection pixel. A signal which has been obtained by interpolating is to be demosaiced as an image signal at the position of the focal-point detection pixel, and the final image is to be acquired.

A plurality of color filters is disposed in each of a plurality of pixels of the image pickup element. In a third embodiment and a fourth embodiment which will be described later, transmission characteristics of the plurality of color filters is let to be of three types namely R (red), G (green), and B (blue).

A filter B is a color filter having transmission characteristics on the shortest wavelength side out of different transmission characteristics of R, G, and B, a filter R is a color filter having transmission characteristics on the longest wavelength side, and a filter G is a color filter having transmission characteristics other than of the filter R and the filter B.

The plurality of color filters may also have other combinations provided that at least a part of a visible range is included, and has at least three types of different transmission characteristics.

The focal-point detection pixel uses the filter G as a color filter which carries out maximum weighting to a luminance signal out of the plurality of color filters, and controls a direction of incidence of a light beam which is incident.

The focal-point detection pixel can be formed such that at least some of the pixels in which, the color filter which carries out maximum weighting to the luminance signal or the color filter having the maximum transmittance from among the plurality of color filters, without restricting to the filter G, restricts the direction of incidence of the light beam which is incident (Variation 1 of Pixel Arrangement).

Figure 7:
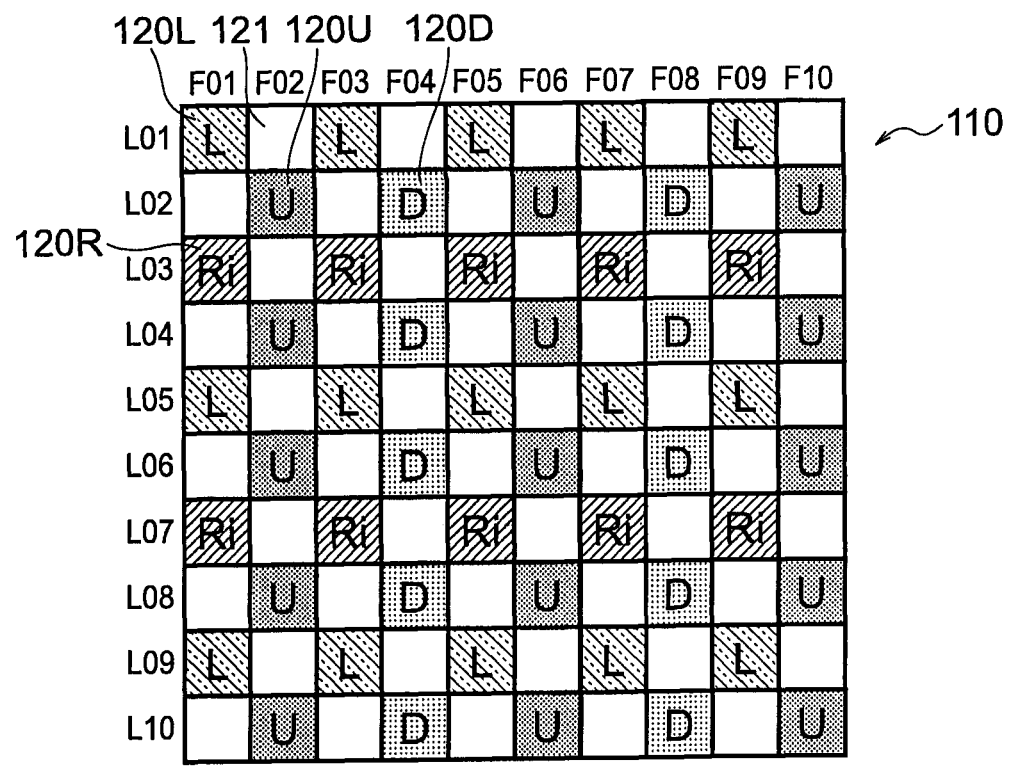
FIG. 7 is a plan view showing a structure (variation 1) of the image pickup element.

FIG. 7 is a plan view showing conceptually a pixel arrangement in an imager according to the first embodiment.

The imager (image pickup apparatus) shown in FIG. 7 is formed by a combination of pixels in which, each pixel center and a center of a pupil of each photoelectric conversion area, or a center of gravity of area are shifted in an upward direction, a downward direction, a rightward direction, and a leftward direction, in pixels shown in FIG. 3, FIG. 4, FIG. 5, and FIG. 6.

FIG. 7 is a diagram in which a photoelectric conversion area when viewed from an optical axial direction of each pixel is shown.

In FIG. 7, an example of 10 vertical pixels (L01 to L10), and 10 horizontal pixels (F01 to F10), in all 100 pixels, is shown. However, the number of pixels is not restricted to 100, and it may be an example in which, the number of pixels is more than 10 million.

In the example shown in FIG. 7, directions in which the center of gravity of area of the photoelectric conversion is shifted with respect to the pixel center are four directions namely, a rightward direction, a leftward direction, an upward direction, and a downward direction. In the following description, the pixels will be called as a right pixel 120R, a left pixel 120L, an upper pixel 120U, and a lower pixel 120D.

In a row of L01 in FIG. 7, the left pixel 120L, an image-pickup pixel 121, the left pixel 120L, and the image-pickup pixel 121 are disposed repeatedly in order from left (From F01).

In a row of L02, the image-pickup pixel 121, the upper pixel 120U, the image-pickup pixel 121, and the lower pixel 120D are disposed repeatedly in order from left.

In a row of L03, the right pixel 120R, the image-pickup pixel 121, the right pixel 120R, and the image-pickup pixel 121 are disposed repeatedly in order from left.

In a row of L04, the image-pickup pixel 121, the upper pixel 120U, the image-pickup pixel 121, and the lower pixel 120D are disposed repeatedly in order from left.

In rows from L05 onward, an arrangement is such that the pattern of L01, L02, L03, and L04 is repeated.

When the arrangement in FIG. 7 is seen from columns F01 to F10, the observation is as follows.

In a column of F01, the left pixel 120L, the image-pickup pixel 121, the right pixel 120R, and the image-pickup pixel 121 are disposed repeatedly in order from top (from L01).

In a column of F02, the image-pickup pixel 121, the upper pixel 120U, the image-pickup pixel 121, and the upper pixel 120U are disposed repeatedly in order from top.

In columns from a column F03 onward, the pattern of F01 and F02 is disposed repeatedly.

In the following description, at the time of indicating a specific pixel, that specific pixel will be expressed by a row number L01 to L10 followed by a column number F01 to F10. For instance, in the row of L01, a pixel corresponding to the column of F01 will be expressed as 'L01 F01'.

In the example shown in FIG. 7, for instance, an arrangement is such that, for the pixel L01 F01 (left pixel 120L) and any one of pixels L02 F02 (upper pixel 120U), L03 F01 (right pixel 120R), and L02 F04 (lower pixel 120D), a distance between centers of pupils of the pixels or a distance between centers of gravity of the pixels is smaller than a distance between pixels which is to be calculated from a pixel pitch.

In the image pickup apparatus according to the first embodiment, it is possible to adjust focus of the optical system by calculating phase-difference information from an output signal (a signal for ranging) from each of a cell group formed by the left pixels 120L and another cell group formed by the right pixels 120R.

For example, by comparing an output waveform acquired from pixels L01 F01, L01 F03, L01 F05, L01 F07, and L01 F09 which are left pixels 120L in the row of L01 and an output waveform acquired from pixels L03 F01, L03 F03, L03 F05, L03 F07, and L03 F09 which are right pixels 120R in the row of L03, it is possible to acquire focal point position information and defocus information from a so-called phase-difference detection formula (Variation 2 of Pixel Arrangement)

Next, an example of another structure of the image pickup element in the image pickup apparatus will be described below.

Figure 8:
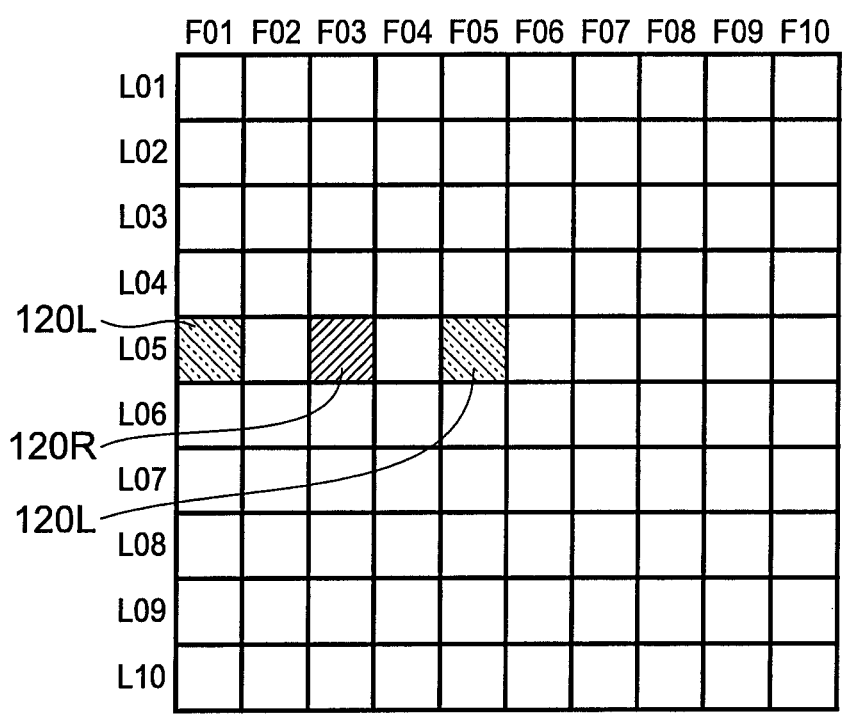
FIG. 8 is a plan view showing a structure (variation 2) of the image pickup element.

In an arrangement in FIG. 8, pixel L05 F01 and pixel L05 F05 are left-side pupil detection pixels. Moreover, pixel L05 F03 is a right-side pupil detection pixel.

Accordingly, it is possible to carry out highly accurate focal-point detection.

(Variation 3 of Pixel Arrangement)

Next, an example of still another structure of the image pickup element in the image pickup apparatus will be described below.

In an arrangement of color filters in FIG. 9, a pixel L01 F01 is let to be a filter G of green color and a pixel L01 F02 is let to be a filter R of red color and this combination pattern is repeated in a horizontal direction.

Moreover, a pixel L02 F01 is let to be a filter B of blue color and a pixel L02 F02 is let to be a filter G of green color and this combination pattern is repeated in the horizontal direction.

Moreover, a pattern of row L01 and a pattern of row L02 are repeated in a vertical direction.

Here, a pixel L05 F01 and a pixel L05 F09 in which, filters G of green color are disposed are left-side pupil detection pixels. Moreover, a pixel L05 F05 is a right-side pupil detection pixel.

Accordingly, it is possible to carry out highly accurate focal-point detection irrespective of a color of the object. However, a combination of direction of shifting of the color filter and the photoelectric conversion area from the pixel center is not restricted to the abovementioned combination.

(Variation 4 of Pixel Arrangement)

Next, an example of still another structure of the image pickup element in the image pickup apparatus will be described below.

In an arrangement of color filters in FIG. 10, a pixel L01 F01 is let to be a filter G of green color and a pixel L01 F02 is let to be a filter R of red color and this combination pattern is repeated in a horizontal direction.

Moreover, a pixel L02 F01 is let to be a filter B of blue color and a pixel L02 F02 is let to be a filter G of green color and this combination pattern is repeated in the horizontal direction.

Moreover, a pattern of row L01 and a pattern of row L02 are repeated in a vertical direction.

Here, the pixel L01 F01, a pixel L01 F09, a pixel L09 F01, and a pixel L09 F09 in which, filters G of green color are disposed are left-side pupil detection pixels.

Moreover, a pixel L05 F01 and a pixel L05 F09 are right-side pupil detection pixels.

Moreover, a pixel L01 F05 and a pixel L09 F05 are upper-side pupil detection pixels.

Furthermore, a pixel L05 F05 is a lower-side pupil detection pixel.

Accordingly, it is possible to carry out highly accurate focal-point detection irrespective of a color of the object. However, a combination of direction of shifting of the color filter and the photoelectric conversion area from the pixel center is not restricted to the abovementioned combination.

Figure 11:
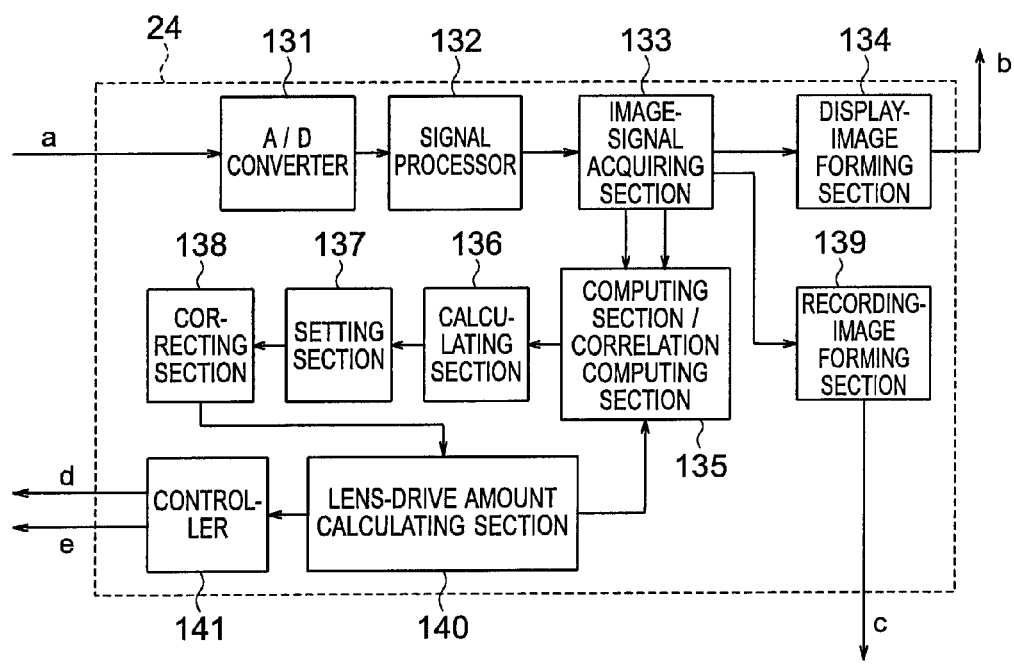
FIG. 11 is a functional block diagram showing a structure of a digital camera.

FIG. 11 is a diagram showing functional blocks of the body controller 24 of an image pickup apparatus 11.

From the image pickup element 22, a signal from the capturing pixel (image-pickup pixel), a signal from the focal-point detection pixel, and a signal for identifying whether it is a first image signal or a second image signal are input to an A/D converter 131 via a line a.

An image-signal acquiring section 133 acquires a signal which has passed through a signal processor 132. A signal from the capturing pixel, or image-pickup pixel is output to the liquid-crystal display element driving circuit 25 from a display-image forming section 134. The liquid-crystal display element 26 displays an image for capturing. A user can observe the image for capturing through an eyepiece 27.

A recording-image forming section 139 forms recording image data based on the signal from the capturing pixel. The recording image data is stored in the memory card 29.

Moreover, the signal from the focal-point detection pixel is output from the image-signal acquiring section 133 to a computing section/correlation computing section 135.

The computing section/correlation computing section 135 carries out correlation matching based on the first image signal and the second image signal, and calculates a defocus amount which has been estimated. A calculating section 136 calculates an accuracy of defocus calculation. A setting section 137 calculates a correction value from a result of the calculating section 136. Furthermore, a correcting section 138 corrects the correction value to reduce an absolute value of the defocus amount which has been estimated.

A lens-drive amount calculating section 140 calculates the lens-drive amount based on a result from the correcting section 138. A controller 141, at the time of video photography, carries out focusing successively by using the defocus amount and the lens-drive amount acquired from the computing section/correlation computing section 135, the calculating section 136, the setting section 137, and the correcting section 138.

Details of a flowchart for focusing by the lens drive by the computing section/correlation computing section 135, the calculating section 136, the setting section 137, the correcting section 138, and the controller 140 will be described later.

FIG. 12A, FIG. 12B, FIG. 12C, FIG. 12D, and FIG. 12E are diagrams explaining a reason why a so-called wobbling occurs at the time of focusing by a phase-difference method, in the conventional structure. In FIG. 12A, FIG. 12B, and FIG. 12C, a horizontal axis denotes a position IP of an image plane. In FIG. 12D and FIG. 12E, a horizontal axis denotes a capturing time. In the following diagrams, similar reference numerals will be used.

FIG. 12A is a diagram describing a case of carrying out focusing for a still image with a sufficient contrast. When a focusing lens is at an initial position, an initial image plane S is positioned at a left side in the diagram. At this time, focusing is to be carried out in a target range by a first ranging with respect to a best image-plane position bst. A range of ranging accuracy, or in other words, a variation in the ranging accuracy is indicated by dashed lines. When the target range of ranging accuracy is accommodated in a depth of field, it is judged to be focused.

FIG. 12D shows how an evaluation value of contrast (vertical axis) changes in this case. It is revealed that the evaluation value of contrast goes on increasing smoothly from the initial image plane position S up to the best image-plane position bst, thereby focusing.

Next, a case in which the contrast of the object is low and there is a wobbling will be described below.

As shown in FIG. 12B, when the contrast of the object is low, the target range of the first ranging, compared to the case in FIG. 12A as indicated by dashed lines, a skirt of curved line showing the accuracy of defocus detection is widened.

Moreover, by the first focusing, the ranging accuracy is degraded, and moves from the image plane position S1 at the start up to a position rearward of the best image-plane position bst, or in other words, to an image plane position G1 on an image-plane side.

Next, as shown in FIG. 12C, in the first focusing, letting the image plane position G1 to be the image plane position at the start, it moves to a second image plane position G1. Since the second image plane position G2 coincides with the best image-plane position bst, the object is focused.

FIG. 12E shows changes in the evaluation value of contrast when the contrast of the object is low. When a video image is captured in such case, as it is evident from a curved line in FIG. 12E, an image is disturbed temporarily due to wobbling, or in other words, an image quality is degraded.

FIG. 13A, FIG. 13B, FIG. 13C, FIG. 13D, and FIG. 13E are diagrams explaining focusing by the phase-difference method when the contrast of the object is low in a structure of the present embodiment.

The following description indicates that it is possible to capture a still image as well as a video image without any wobbling even when the contrast of the object is low.

As shown in FIG. 13A, when the contrast of the object is low, the target range of the first ranging (accuracy of defocus detection indicated by a curve) has a widened skirt as shown by dashed lines. Moreover, as a result of the first ranging, the image plane position S1 at the start moves to the image plane position G1. The image plane position G1 is at a position frontward of the best image-plane position bst, or in other words, is positioned on the object side.

The image plane position G1 is determined by a predetermined procedure which will described later in detail.

In FIG. 13B, letting the image plane position G1 to be a starting position S2, a second focusing is to be carried out. Moreover, as a result of a second ranging, the image plane position S2 moves to an image plane position G2. The image plane position G2 is at a position frontward of the best image-plane position bst, or in other words, is positioned on the object side.

The image plane position G2 is also determined by a predetermined procedure which will be described later in detail.

In FIG. 13C, letting the image plane position G2 to be a starting position S3, a third focusing is to be carried out. Moreover, as a result of a third ranging, an image plane position S3 moves to an image plane position G3. A focusing position G2 is at a position frontward of the best image-plane position bst, or in other words, is positioned on the object side.

In FIG. 3D, letting the image plane position G3 to be a starting portion S4, a fourth focusing is to be carried out. Moreover, as a result of a fourth ranging, an image plane position S4 moves to an image plane position G4. Since a focusing position G4 coincides with the best image-plane position bst, the object is focused.

Here, a process in further detail till focused to the best image-plane position bst will be described below. The process will be described concretely upon returning to FIG. 13A. A distance between the initial position S1 of the image plane (an image plane position before the focusing starts) and the best image-plane position bst corresponds to a true defocus amount Dtrue.

Here, in the first focusing, an image plane position a of an absolute value Dest of the defocus amount which has been estimated is calculated. At this time, $3\sigma$ which is the accuracy of defocus detection (normal distribution of ranging accuracy) ($\sigma$ denotes a standard deviation) is let to be '$3\sigma 1$'. '$3\sigma 1$' corresponds to a correction value.

The correcting section 138 corrects the correction value 361 acquired from the result of the setting section 137 to reduce the absolute value of the defocus amount Dest which has been estimated. In other words, the correcting section 138 subtracts a length (distance) corresponding to '$3\sigma 1$' from the defocus amount Dest which has been estimated. The result of subtraction is let to be the image plane position G1 by the first ranging.

Even in the second ranging shown in FIG. 13B, a similar process is to be carried out. Letting the image plane position G1 to be the starting position S2, the second focusing is to be carried out. An image plane position a' which is an absolute value Dest' of the defocus amount which has been estimated, is calculated. At this time $3\sigma$ which is the accuracy of defocus detection (normal distribution of ranging accuracy) ($\sigma$ denotes a standard deviation) is let to be '$3\sigma 2$'. '$3\sigma 2$' is the correction value. The correcting section 138 corrects the correction value $3\sigma 2$ acquired from the result of the setting section 137 to reduce the absolute value of the defocus amount Dest' which has been estimated. In other words, the correcting section 138 subtracts $3\sigma 2$ from the defocus amount Dest' which has been estimated. The result of subtraction is let to be the image plane position G2 by the second ranging.

Hereafter, a similar process is to be repeated. Accordingly, it is possible to set (focus) the image plane positions G1 and G2 all the time on the object side of the best image-plane position bst. As a result, during focusing, the image plane position, while sandwiching the best image-plane position bst, does not move rearward or frontward. Accordingly, it is possible to carry out focusing without wobbling, up to the best image-plane position bst. The abovementioned processing procedure, when indicated by a numerical expression, is as follows.

$$L = (\mathrm{def}/|\mathrm{def}|) \times (|\mathrm{def}| - |\Delta \mathrm{def}|) \quad (A)$$

where,

L denotes a result of a calculation by the correcting section. The lens-drive amount is to be calculated by using the defocus amount, and the focusing is to be carried out.

def denotes the defocus amount estimated which has been computed by the computing section, and $\Delta$def denotes a correction value which has been set by the setting section.

In expression (A), a term (def/|def|) indicates a direction (positive or negative) of a lens which is driven. |def| corresponds to the absolute value of the defocus amount Dest which has been estimated. Moreover, $\Delta$def corresponds to '$3\sigma$' which is the ranging accuracy (normal distribution) in the abovementioned example.

Next, a focusing operation according to this embodiment will be described below in further detail by using a flowchart.

Figure 14:
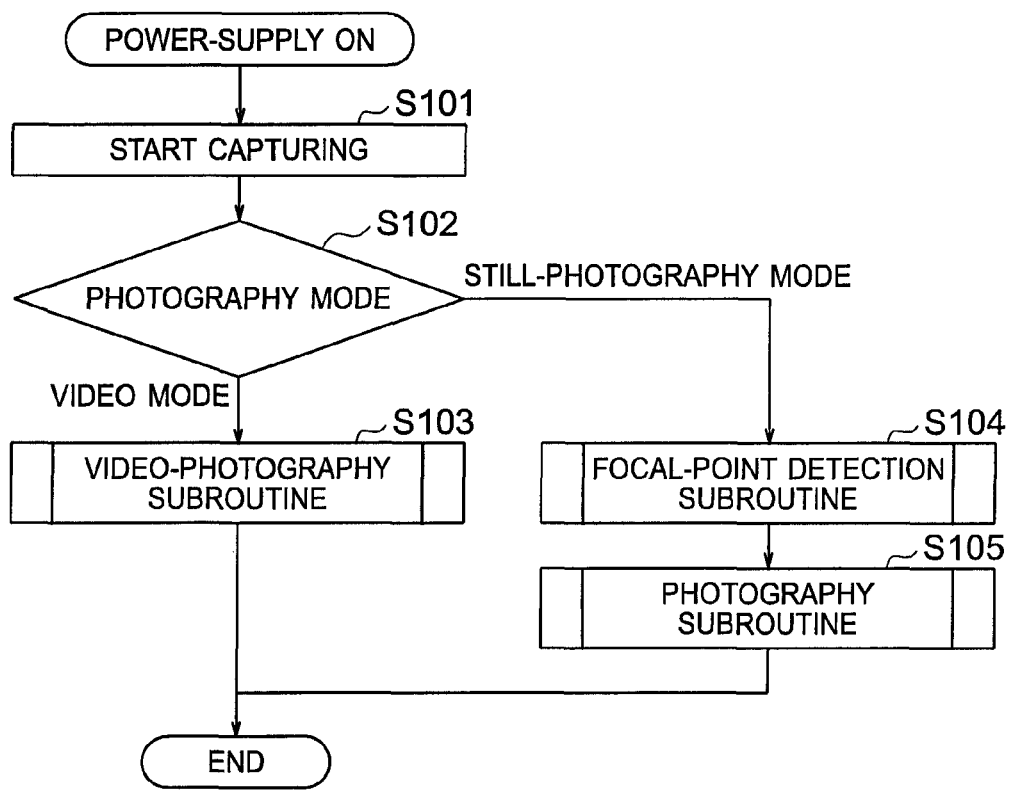
FIG. 14 is a flowchart showing a processing procedure at the time of video photography.

FIG. 14 is a flowchart showing a brief flow of capturing. The flowchart is divided mainly into two parts namely a flow of image formation and a flow of focal-point detection. Firstly, the flow of image formation will be described below.

At step S101, capturing starts. At step S102, the user selects a photography mode.

When a video-photography mode is selected at step S102, the process advances to step S103 and video-photography subroutine which will be described later is executed.

Moreover, at step S102, when a still-photography mode is selected, the process advances to step S104, and focal-point detection subroutine is executed. Thereafter, at step S105, an image pickup subroutine is executed. However, the flow is not restricted to the flow in FIG. 14.

For instance, after a power supply has been put ON, an initial-state detection, an image pickup element drive, and a preview image display may be carried out.

Moreover, capturing starts after half-pressing a shutter button, and the process shifts to the focal-point detection subroutine, and after focusing, an image to be verified is displayed.

The flow may be such that the process shifts to photography (image pickup) subroutine after the shutter button is fully pressed.

Figure 15:
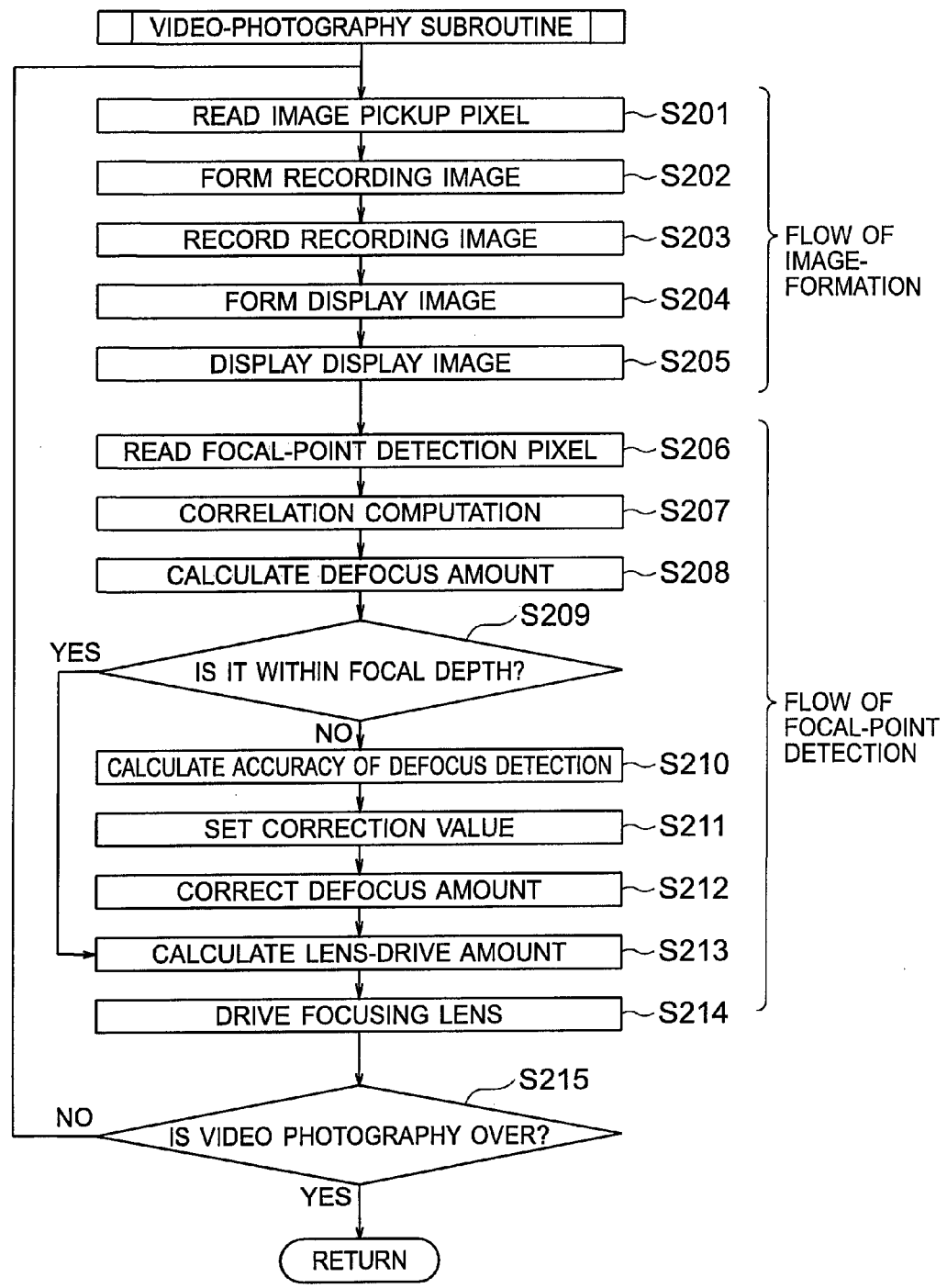
FIG. 15 is a flowchart showing a flow of a video-photography subroutine.

Firstly, the video-photography subroutine will be described below. FIG. 15 is a flow chart describing a flow of the video-photography subroutine.

At step S201, the image-signal acquiring section 133 reads image-pickup pixels. At step S202, the recording-image forming section 139 forms a recording image. At step S203, the recording image is recorded in a recording medium such as a memory card 29. For the pixel read out, an arrangement may be made to carry out a process for pixel full frame read out (all-pixel reading out) and a process for thinning-out reading. An arrangement for interpolating defective pixels is included in image structure. Moreover, an arrangement may be made such that a pixel signal of a position of a pixel subjected to focal-point detection is calculated from pixel addition and pixel interpolation.

At step S204, the display-image forming section 134 forms an image for display based on a signal from the image-pickup pixel. At step S205, the liquid-crystal display element 26 displays an image.

The flow of the image formation includes a process from step S201 to step S205.

Next, the flow of the focal-point detection will be described below.

At step S206, the image-signal acquiring section 133 reads a signal from the focal-point detection pixel. At step S207, the computing section/correlation computing section 135 carries out correlation matching of the first image signal and the second image signal, and calculated the defocus amount which has been estimated.

At step S209, a judgment of whether or not the defocus amount that has been calculated is within a focal depth (depth of focus) is made. When a judgment result at step S209 is negative (No), at step S210, the calculating section 136 calculates an accuracy of defocus calculation.

Here, ranging for verification is carried out, and when it is judged to be within the focal depth, correction of the defocus amount is not to be carried out. Therefore, when the judgment result at step S209 is affirmative (Yes), the process advances to step S213, and a drive amount of a focusing lens is calculated.

At step S211, the setting section 137 calculates a correction value from a result of the calculating section 136. At step S212, the correcting section 138 corrects the correction value to reduce an absolute value of the defocus amount which has been estimated.

Concretely, a defocus-correction amount based on a pixel pitch of the image pickup element, Fno, and a focal length of an image pickup optical system, is added. Accordingly, since it is possible to have an operation with no focusing at a position rearward of the best image-plane position bst, there is no degradation of image quality even in the video photography. At step S213, the lens-drive amount calculating section 140 computes the lens-drive amount based on a result from the correcting section 138. At step S214, the controller 141, at the time of video photography, carries out focusing successively by using the lens-drive amount and the defocus amount acquired from the computing section/correlation computing section 135, the calculating section 136, the setting section 137, and the correcting section 138.

At step S215, a judgment of whether or not the video photography is over is made. When a judgment result at step S215 is negative (No), the process returns to step S201. When the judgment result at step S215 is affirmative (Yes), the subroutine is terminated.

Figure 16:
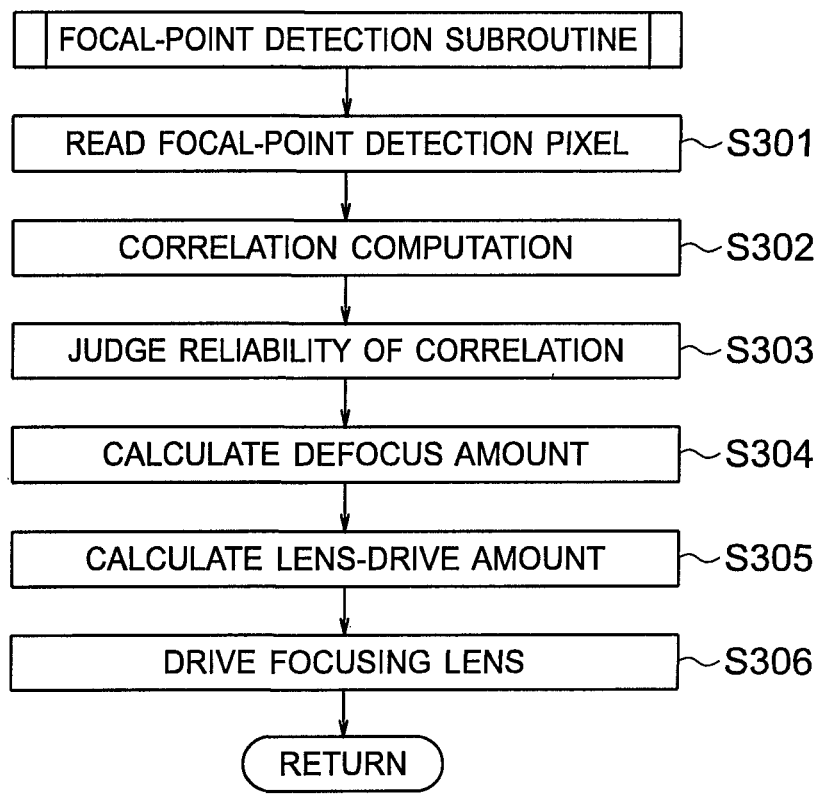
FIG. 16 is a flowchart showing a flow of focal-point detection.

FIG. 16 is a flowchart showing a flow of the focal-point detection subroutine at the time of still-photography mode. At step S301, the image-signal acquiring section 133 reads a signal from the focal-point detection pixel.

At step S302, the computing section/correlation computing section 135 carries out correlation matching of the first image signal and the second image signal. At step S303, a reliability of a correlation matching result is judged. At step S304, the computing section/correlation computing section 135 calculates the defocus amount. At step S305, the lens-drive amount calculating section 140 calculates the lens-drive amount. At step S306, the focusing lens 20 is driven via the controller 141 and the lens driving section 16.

Figure 17:
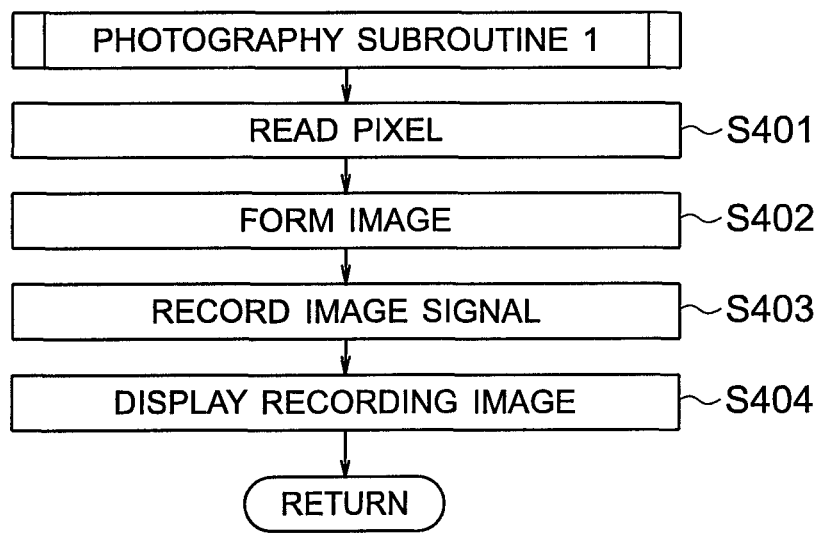
FIG. 17 is a flowchart showing a flow of capturing.

FIG. 17 is a flowchart showing a flow of a capturing subroutine 1. At step S401, the image-signal acquiring section 133 reads a signal from the image-pickup pixel. At step S402, image data is formed based on the signal that has been read. For the pixel read out, an arrangement may be made to carry out a process for pixel full frame readout (all-pixel reading out) and a process for thinning-out reading. An arrangement for interpolating defective pixels is included in the image structure. Moreover, an arrangement may be made such that a pixel signal of a position of a pixel subjected to focal-point detection is calculated from pixel addition and pixel interpolation.

At step S403, an image signal that has been generated is stored temporarily. Moreover, at step S404, the liquid-crystal display element 26 displays an image which has been recorded.

The body controller has a structure for carrying out the focal-point detection subroutine and the photography (image pickup) subroutine.

Moreover, the flow of the capturing subroutine 1 is not restricted to the abovementioned flowchart. For instance, an initial-state detection, an image pickup element drive, and a preview image display may be carried out after selecting the mode.

Moreover, the flow may be such that capturing starts after half-pressing the shutter button, and the process shifts to the focal-point detection subroutine, and after focusing, an image to be verified is displayed, and further, the process shifts to image pickup, or capturing subroutine after the shutter button is fully pressed.

The flowchart is not restricted to the abovementioned flow. As an embodiment, the flow of the image formation and the flow of the focal-point detection were let to tandem processes. However, an order of the flow of the image formation and the flow of the focal-point detection may be reversed. Moreover, the flow of the image formation and the flow of the focal-point detection may be parallel processes.

As it has been described above, in this embodiment, an arrangement is such that the ranging operation in which there is no focusing at a position rearward of the best image-plane position is carried out even when the ranging accuracy is degraded. Therefore, even in the video photography, there is no degradation of the image quality. As a result, it is possible to provide an image pickup apparatus having favorable focal-point detection performance with a little degradation of image quality, even in the video photography.

Moreover, the image pickup optical system may have a recording section in which, defocus-detection accuracy is recorded. In this case, the calculating section 136 reads the defocus-detection accuracy from the recording section.

Moreover, the calculating section 136 calculates the defocus-detection accuracy based on the result of the computing section/correlation computing section 135 which is a computing section.

The following two calculation methods are available for calculating the defocus-detection accuracy.

(1) Focusing by phase-difference method may be repeated for a predetermined number of times such as 20 times. Moreover, variation is calculated statistically from a result of focusing.

(2) Variation is calculated from degree of correlation of two images from different pupils.

The setting section 137 determines an amount of correction based solely on the result of the computing section/correlation computing section 135 which is a computing section. 'Based solely on the result of the computing section/correlation computing section 135 means the abovementioned variation achieved statistically and variation achieved by correlation computing.

For instance, let the defocus amount corresponding to $3\sigma$ which is normal distribution of the ranging accuracy be the correction amount. Letting a value obtained upon subtracting from the defocus amount which is the result of the computing section to be the defocus amount, a focusing operation is to be carried out. Accordingly, there is no focusing at a position rearward of the best image-plane position.

In other words, it is possible to provide an image pickup apparatus having favorable focal-point detection performance with a little degradation of image quality, even in the video photography.

Moreover, the setting section 137 is also capable of determining the correction amount based on the result of the calculating section 136 and the focal depth of the capturing state.

For instance, it is also possible to let the correction value to be 'normal distribution $3\sigma$–focal depth' of the ranging accuracy. Moreover, by carrying out the focusing operation by letting the value obtained upon subtracting from the defocus amount which is the result of the computing unit to be the defocus amount, there is no focusing at a position rearward of the best focus position.

In other words, it is possible to provide an image pickup apparatus having favorable focal-point detection performance with a little degradation of image quality, even in the video photography.

It is desirable to have a judging section which makes a judgment of whether the defocus position which is a result of the correcting section is within (inside) or outside the focal depth of the capturing state.

The judging section makes a judgment of whether the defocus amount which has been estimated, for instance, the image plane position a in FIG. 13A and the image plane position a' in FIG. 13B are within or outside the focal depth.

Accordingly, when the image plane positions a and a' are within the focal depth, it is possible to terminate focusing. Moreover, when the image plane positions a and a' are outside the focal depth, it is possible to continue focusing.

This corresponds to the judgment at step S209 in the flowchart in FIG. 15. Moreover, it is also possible to let the image pickup apparatus have the following structure.

An image pickup apparatus has an image pickup optical system which can be mounted or fixed, and an image pickup element in which, pixels having photoelectric converter are arranged in rows two-dimensionally, and at least some of the pixels are focal-point detection pixels which are arranged such that a direction of incidence of a light beam which is incident on the pixel is restricted, and the pixels other than the focal-point detection pixels are arranged such that the light beam incident on the pixel is not as restricted as for the focal-point detection pixel, and the focal-point detection pixel outputs at least a signal for ranging, and the image-pickup pixel outputs at least a signal for an image, and the image pickup apparatus which is capable of video photography, having an image pickup optical system which can be mounted or fixed, and an image pickup element in which, pixels having a photoelectric converter are arranged in rows two-dimensionally has a computing section which computers a defocus amount which has been estimated, a calculating section which calculates an accuracy of defocus detection, a setting section which sets a correction value from a result of the calculating section, a correcting section which corrects the correction value obtained from the result of the setting section, to reduce an absolute value of the defocus amount which has been estimated, a lens-drive amount calculating section which calculates a lens-drive amount based on a result from the correcting section, and a controller which, at the time of video photography, carries out focusing successively by using the defocus amount and the lens-drive amount obtained from the computing section, the calculating section, the setting section, and the correcting section.

As it has been described above, according to the present embodiment, even when the ranging accuracy is degraded, it is possible to focus all the time on the object side of the best image-plane position, and to reduce wobbling.

As it has been described above, the present invention is suitable for an image pickup apparatus in which, there is a little fluctuation in the ranging accuracy and no degradation of ranging performance.

According to the present invention, it is possible to provide an image pickup apparatus having favorable focal-point detection performance with a little degradation of image quality, even in the video photography.

What is claimed is:

1. An image pickup apparatus which is capable of video photography, having an image pickup optical system which can be mounted or fixed, and an image pickup element in which, pixels having a photoelectric converter are arranged in rows two-dimensionally, comprising:

a calculating section which calculates a correction value from an accuracy of defocus detection, the accuracy of defocus detection denoting a variation of focusing;

a computing section which computes an estimated defocus amount which has been estimated using the accuracy of defocus detection;

a correcting section which corrects a current defocus amount, to reduce an absolute value of the current defocus amount by subtracting the correction value from the estimated defocus amount;

a lens-drive amount calculating section which calculates a lens-drive amount based on a result from the correcting section; and a controller which, at the time of video photography, carries out focusing successively by using the current defocus amount and the lens-drive amount obtained from the computing section, the calculating section, and the correcting section.

2. The image pickup apparatus according to claim 1, wherein the image pickup optical system has a recording section in which, the accuracy of defocus detection is recorded, and the calculating section reads the accuracy of defocus detection from the recording section.

3. The image pickup apparatus according to claim 1, wherein the correcting section corrects the current defocus amount, based on the result of the calculating section and a focal depth of a capturing state.

4. The image pickup apparatus according to claim 1, further comprising:

a correlation computing section which makes a judgment of whether a defocus position which is a result of the correcting section is within or outside a focal depth of a capturing state, and whether a successive focusing is necessary or not is determined based on a judgment result of the correlation computing section.

5. An image pickup apparatus having an image pickup optical system which can be mounted or fixed, and an image pickup element in which, pixels having a photoelectric converter are arranged in rows two-dimensionally, wherein at least some of the pixels are focal-point detection pixels which are arranged such that a direction of incidence of a light beam which is incident on the pixel is restricted, and the pixels other than the focal-point detection pixels are arranged such that the light beam incident on the pixel is not as restricted as for the focal-point detection pixel, and the focal-point detection pixel outputs at least a signal for ranging, and the image-pickup pixel outputs at least a signal for an image, and the image pickup apparatus which is capable of video photography, comprising:

a calculating section which calculates a correction value from an accuracy of defocus detection, the accuracy of defocus detection denoting a variation of focusing;

a computing section which computes an estimated defocus amount which has been estimated using the accuracy of defocus detection;

a correcting section which corrects a current defocus amount, to reduce an absolute value of the current defocus amount by subtracting the correction value from the estimated defocus amount;

a lens-drive amount calculating section which calculates a lens-drive amount based on a result from the correcting section; and a controller which, at the time of video photography, carries out focusing successively by using the current defocus amount and the lens-drive amount obtained from the computing section, the calculating section, and the correcting section.

* * * * *